UNITED STATES PATENT OFFICE

RICHARD FLEISCHHAUER AND CARLTHEO SCHULTIS, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

BLACK AZODYESTUFFS AND PROCESS OF MAKING SAME

No Drawing. Application filed October 2, 1930, Serial No. 486,052, and in Germany October 9, 1929.

Our present invention relates to new azodyestuffs which yield black dyeings of an excellent fastness to light and washing when after-treated with an aldehyde and with a copper salt, and it relates furthermore to a process of making such dyestuffs.

The process of manufacture in accordance with this invention comprises combining a 1-amino-8-hydroxy-naphthalene sulfonic acid of the general formula:

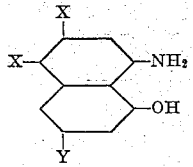

wherein one X means hydrogen, the other X a sulfonic acid group and Y means hydrogen or a sulfonic acid group 7 with the diazocompound of two amines of the formulae:

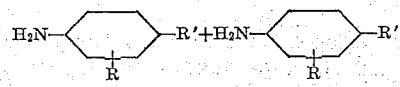

wherein one R means hydrogen, an alkoxy, hydroxyl or carboxylic acid group, the other R an alkoxy, hydroxyl or carboxylic acid group, the two R' means nitro- or acylamino groups and the benzene nuclei may contain further substituents, transforming in the diazo-dyestuffs thus produced the groups R' into amino groups in the known manner, tetrazotizing and combining these tetrazo compounds with two compounds of the formula

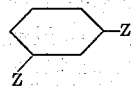

wherein each Z means an amino or hydroxy groups and the benzene nucleus may contain further substituents.

The dyestuffs thus obtained correspond probably to the general formula

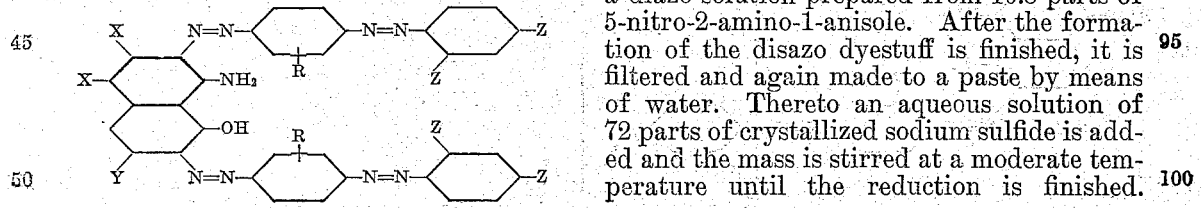

wherein X, Y, Z, R and the benzene nuclei have the aforesaid signification.

The above mentioned after-treatment is advantageously carried out on the fiber. For this purpose the dyed goods are treated, simultaneously or in any sequence, with an aldehyde, especially formaldehyde, and with a copper salt.

It is a remarkable fact that the formation of a copper complex takes place in conjunction with the action of the aldehyde and furthermore that the fastness to washing is not injured by this combined treatment.

It is well known in the art that the fastness to washing is improved by treating certain direct black cotton dyestuffs on the fiber with formaldehyde. However the dyeings thus obtained exhibit relatively little fastness to light. This disadvantage, which could hitherto not be avoided even by any further treatment, prevented a larger employment of the after-treatment with formaldehyde. By the combined after-treatment of the dyestuffs of the present invention no injury of such a nature has been observed.

In order to further illustrate our invention, the following examples are given, the parts being by weight and all temperatures in centigrade degrees. We wish it however to be understood that we are not limited to the particular products nor reaction conditions mentioned therein.

Example 1

16.8 parts of 5-nitro-2-amino-1-anisole are diazotized in the customary manner. The diazo solution thus obtained is combined in an alkaline medium with 31.9 parts of 1-amino-8-hydroxynaphthalene-4.6-disulfonic acid. The mass is rendered alkaline by means of an excess of sodium carbonate and the monoazo dyestuff is again combined with a diazo solution prepared from 16.8 parts of 5-nitro-2-amino-1-anisole. After the formation of the disazo dyestuff is finished, it is filtered and again made to a paste by means of water. Thereto an aqueous solution of 72 parts of crystallized sodium sulfide is added and the mass is stirred at a moderate temperature until the reduction is finished.

Then the reduced dyestuff is precipitated by the addition of common salt, filtered and washed. The paste thus produced which dissolves in water to a bluish green solution is again suspended in water and mixed with an aqueous solution of 14 parts of sodium nitrite and with the necessary amount of hydrochloric acid. When the tetrazotation is finished, the mass is allowed to run into a solution containing 22 parts of 3-amino-1-hydroxybenzene and an excess of sodium carbonate. After the end of the combining reaction the precipitated dyestuff is filtered and dried. It represents a black bronzy powder soluble in water and dyeing the vegetable fiber reddish black shades. It corresponds probably to the formula:

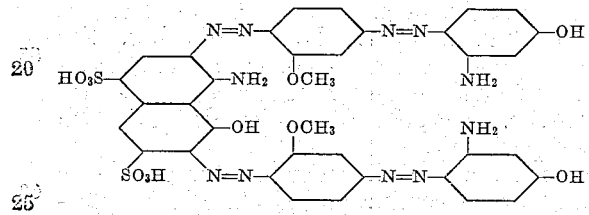

The dyeing may be after-treated in the following manner: The goods dyed in the usual way are rinsed, treated for 20–30 minutes in a hot or boiling bath containing about 3% of a solution of formaldehyde of 30% strength and about 0,5% of copper sulfate (calculated to the dye-good) rinsed and dried. The dyeings after-treated in this manner have become somewhat more greenish and are distinguished by an excellent fastness to washing, boiling with acid and to light.

The after-treatment may also be carried out subsequently in two operations.

*Example 2*

The tetrazo compound of the amino-disazodyestuff prepared according to Example 1 is mixed while cooling with an aqueous solution of 10.8 parts of meta-phenylenediamine. The free mineral acid is neutralized for instance with sodium acetate. Then an aqueous solution of 11 parts of resorcinol is added and a solution of sodium carbonate is allowed to run in in order to finish the formation of the dyestuff. The dyestuff thus produced corresponds to the probable formula:

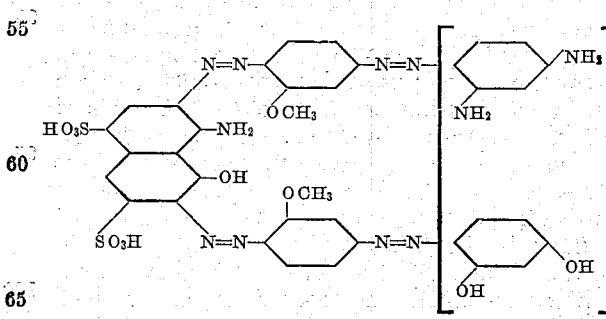

It represents when dry a black powder soluble in water, dyeing the vegetable fiber reddish black shades. These dyeings become somewhat more greenish and very fast to washing, boiling with acid and to light when after-treated with acetaldehyde and copper acetate in the manner described in Example 1.

*Example 3*

When in Example 1 double the equivalent amount of 5-nitro-4-methyl-2-amino-1-anisole is used as diazo-compound instead of 5-nitro-2-amino-1-anisole, an analogous greenish blue disazodyestuff is obtained by combination with 1-amino-8-hydroxy-naphthalene-4.6-disulfonic acid and by following reduction. The tetrazo compound of this disazodyestuff is allowed to run into an aqueous solution containing 22 parts of resorcinol and an excess of sodium carbonate. The new dyestuff isolated in the customary manner represents a black powder soluble in water and dyeing cotton black shades. It corresponds to the formula:

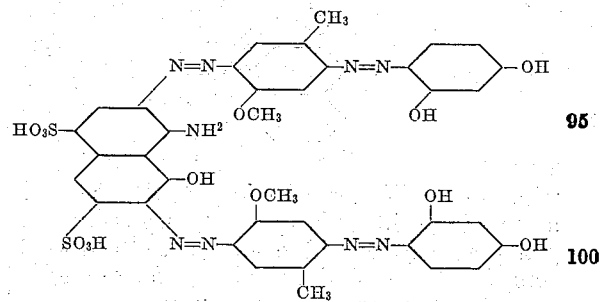

By an after-treatment with formaldehyde the dyeings become fast to washing; by an after-treatment with formaldehyde and copper salts they become more bluish and notably fast to washing and light.

Dyestuffs of similar properties are obtained by replacing resorcinol for instance by 2.4.4'-triamino-diphenyl, meta-phenylene-diamine, meta-toluylene-diamine, 2.4-diamino-1-anisole, 2.4-diamino-diphenylamine, 2.4-diamino-diphenylether-4'-sulfonic acid.

*Example 4*

13.8 parts of 4-nitro-aniline are diazotized in the usual manner and the diazo compound is combined in an acid medium with 31,9 parts of 1-amino-8-hydroxy-naphthalene-4.6-disulfonic acid. The monoazo dyestuff is combined in a solution rendered alkaline by means of sodium carbonate with the diazo compound of 13.8 parts of 5-nitro-2-amino-1-anisole. The disazo dyestuff is isolated and then reduced with a solution of 72 parts of crystallized sodium sulfide. The reduced dyestuff is tetrazotized in an aqueous suspension with a solution of 14 parts of sodium nitrite and with an excess of hydrochloric acid and then combined with a solution containing 22 parts of meta-phenylene-diamine and an excess of sodium carbonate. The new dyestuff thus obtained is isolated by the addition of common salt. It corresponds probably to the formula:

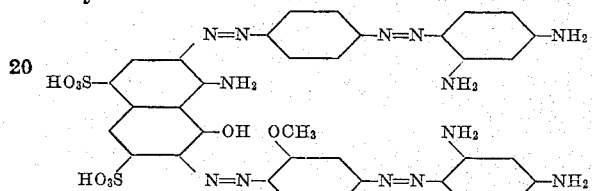

It represents when dry a black powder soluble in water, dyeing cotton black shades which become somewhat more greenish and fast to washing and light when after-treated with formaldehyde and copper salts.

Dyestuffs of similar properties are obtained by replacing 1-amino-8-naphthol-4.6-disulfonic acid by 1-amino-8-hydroxy-3.6-disulfonic acid or 1-amino-8-naphthol-4-sulfonic acid or by using as diazo compounds in any sequence on the one hand for instance 4-nitro-aniline-2-carboxylic acid, 5-nitro-2-amino-1-phenol, 5-nitro-4-chloro-2-amino-1-anisole, and on the other hand for instance 2-chloro-4-nitro-aniline, 2.6-dichloro-4-nitro-aniline, 2-methyl-4-nitro-aniline or sulfonic acids of these compounds.

*Example 5*

13.8-parts of 4-nitro-aniline are diazotized in the usual manner and combined in an acidic medium with 31.9 parts of 1-amino-8-hydroxy-naphthalene-3.6-disulfonic acid. Into the solution of this monoazo dyestuff rendered alkaline with sodium carbonate a diazo solution of 19.4-parts of 2-acetylamino-4-methyl-5-amino-1-anisole is introduced. The disazo dyestuff is filtered off, saponified by heating it with a 10% caustic soda solution and then reduced with an aqueous solution of 36 parts of crystallized sodium sulfide. The amino disazo dyestuff which dissolves in water with a greenish blue tint is tetrazotized in the manner described in Example 1. The suspension of the tetrazo compound is allowed to run into a solution containing an excess of sodium carbonate and 21.8 parts of 3-amino-phenol. The dyestuff is isolated as usually. It corresponds probably to the formula:

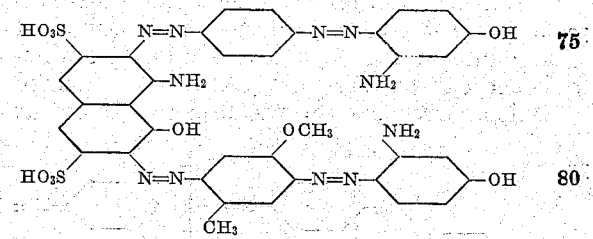

It represents when dry a black powder soluble in water, dyeing the vegetable fiber full black shades becoming fast to washing and light when after-treated with formaldehyde and copper salts.

The same dyestuff may also be produced by using instead of 4-nitroaniline the equivalent amount of 4-acetylamino-1-amino-benzene and by omitting the treatment with sodium sulfide.

Similar dyestuffs are obtained when 2-acetylamino-4-methyl-5-amino-1-anisole is replaced by the equivalent amount of 4-acetylamino-4'-amino-2'.5'-dimethoxy-1.1'-azobenzene or of 4-acetylamino-2.5-dimethoxy-1-aminobenzene.

*Example 6*

The diazo compound of 18 parts of 2-acetylamino-5-amino-1-anisole is combined in a feebly acid medium with 31.9 parts of 1-amino-8-hydroxy-naphthalene-4.6-disulfonic acid and the monoazo dyestuff is combined in the presence of an excess of sodium carbonate with the diazo compound of 15 parts of 4-acetylamino-1-aminobenzene. The blue disazo dyestuff is isolated, saponified with a 10% caustic soda lye, again isolated and then tetrazotized. The free mineral acid is neutralized by the addition of a sodium acetate solution and the mass is mixed, while cooling with ice, with a neutral solution of about 10 parts of meta phenylene diamine. When a test shows that the phenylene diamine has disappeared an aqueous solution of about 11 parts of resorcinol and an amount of sodium carbonate sufficient for keeping the mass alkaline are added.

The dyestuff thus produced corresponds to the probable formula:

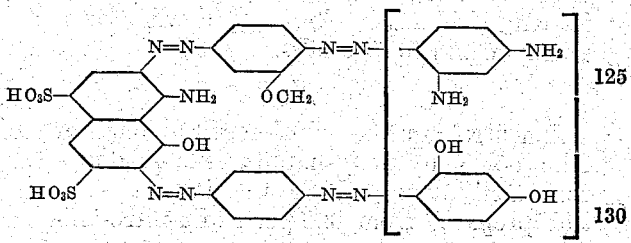

It represents when dry a black powder, soluble in water, dyeing the vegetable fiber full black shades which become somewhat more bluish and fast to washing and light when after-treated with formaldehyde and copper salts.

*Example 7*

When in Example 6 4-acetylamino-1-aminobenzene is replaced by the equivalent amount of 2-acetylamino-4-chloro-5-amino-1-methoxy-benzene, a dyestuff is obtained which corresponds to the probable formula:

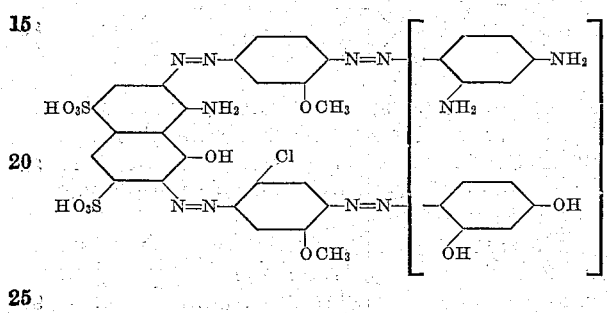

It yields when after-treated on the fiber with formaldehyde and copper salts bluish black shades, notably fast to washing and light.

*Example 8*

The diazo solution of 18 parts of 2-acetyl-amino-5-amino-1-anisole is combined in an acidic medium with 23.9 parts of 1-amino-8-hydroxy-naphthalene-4-sulfonic acid and the monoazodyestuff is again combined in the presence of sodium carbonate with the same diazo compound. The isolated disazo dyestuff is saponified by means of a caustic soda lye of about 10% strength and then tetrazotized as described above. The suspension of the tetrazo compound is combined in the presence of sodium carbonate with 22 parts of resorcinol. The dyestuff thus produced corresponds probably to the formula:

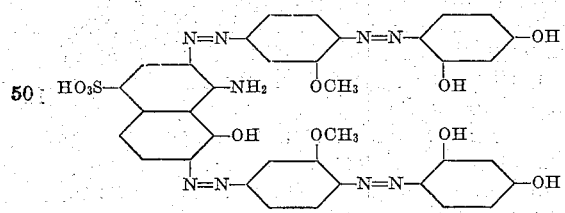

It represents a black, water-soluble powder dyeing cotton full black shades fast to washing and light when after-treated with formaldehyde and copper salts.

*Example 9*

A neutral aqueous solution of 31.6 parts of 1-amino-8-hydroxy-naphthalene-4.6-disulfonic acid introduced into an acid diazo solution prepared from 13.8 parts of 4-nitro-aniline. When the combination is finished the monoazo dyestuff is mixed with an excess of sodium carbonate and then combined with the diazo compound of 15.4 parts of 5-nitro-2-amino-1-hydroxy-benzene. The aqueous paste of the isolated disazo dyestuff is reduced at 55° while stirring with an aqueous solution of 72 parts of crystallized sodium sulfide. The isolated reduction product is tetrazotized at 0° and the tetrazo compound is combined with 21.6 parts of 1.3-diamino-benzene in the presence of sodium carbonate.

The dyestuff thus produced corresponds to the formula:

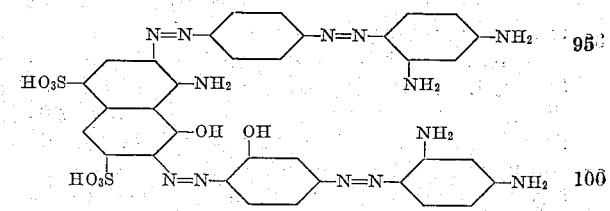

It represents when dry a black powder dyeing cotton black shades fast to light and washing when after-treated with formaldehyde and copper salts.

*Example 10*

When in Example 9, 15.4 parts of 5-nitro-2-amino-1-hydroxy-benzene are replaced by 18.2 parts of 5-amino-2-nitro-benzene-1-carboxylic acid and the process is otherwise carried on in a like manner, a dyestuff of similar properties is obtained which corresponds probably to the formula:

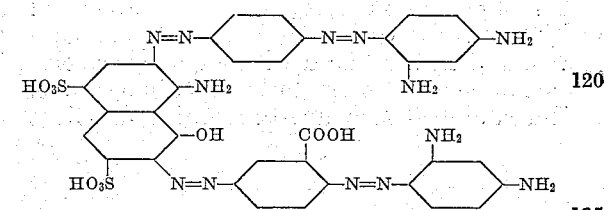

Its dyeings on cotton become likewise fast to washing and light when after-treated with an aldehyde and copper salts.

We claim:

1. A process which comprises combining a 1-amino-8-hydroxy-naphthalene sulfonic acid of the general formula:

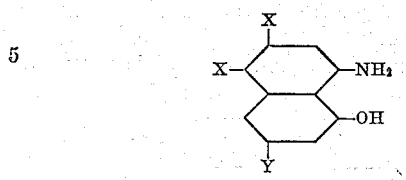

wherein one X means hydrogen, the other X a sulfonic acid group and Y means hydrogen or a sulfonic acid group, with the diazo compounds of two amines of the formulæ:

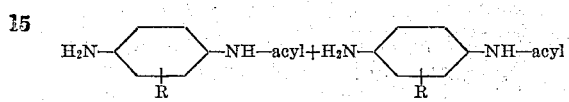

wherein one R means hydrogen, an alkoxy, hydroxyl or carboxylic acid group, the other R an alkoxy, hydroxyl or carboxylic acid group, and the benzene nuclei may contain a halogen, alkoxy, alkyl or sulfonic acid group, transforming in the disazo dyestuffs thus produced the acylamino groups into amino groups by saponification, tetrazotizing and combining these tetrazo compounds with two compounds of the formula:

wherein each Z means an amino or hydroxy group.

2. A process which comprises combining 1-amino-8-hydroxy-naphthalene 4.6-disulfonic acid of the formula:

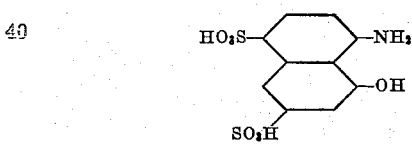

with the diazo compounds of two amines of the formulæ:

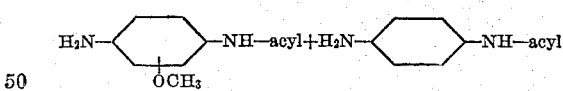

wherein the benzene nuclei may be further substituted by chlorine methoxy or methyl, transforming in the disazo dyestuffs thus produced the acylamino groups into amino groups by saponification, tetrazotizing and combining these tetrazo compounds with two compounds of the formula:

wherein each Z′ means an amino or hydroxy group.

3. A process which comprises combining 1-amino-8-hydroxy-naphthalene 4.6-disulfonic acid of the formula:

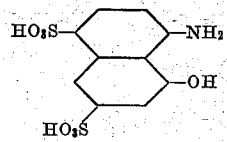

in an acidic medium with one molecular proportion of diazotized 2-acetylamino-5-amino-1-anisole and in an alkaline medium with one molecular proportion of diazotized 4-acetylamino-1-amino-benzene, saponifying in the disazo dyestuff thus produced the acetylamino groups into amino groups, tetrazotizing and combining this tetrazo compound with one molecular proportion of meta-phenylene-diamine and one molecular proportion of resorcinol.

4. A process which comprises combining 1-amino-8-hydroxy-naphthalene-4.6-disulfonic acid of the formula:

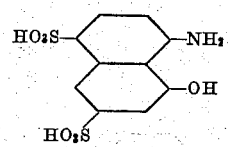

in an acidic medium with one molecular proportion of diazotized 2-acetylamino-5-amino-1-anisole and in an alkaline medium with one molecular proportion of diazotized 2-acetylamino-4-chloro-5-amino-1-anisole, saponifying in the disazo dyestuff thus produced the acetylamino groups into amino groups, tetrazotizing and combining this tetrazo compound with one molecular proportion of meta-phenylene-diamine and one molecular proportion of resorcinol.

5. The azo dyestuffs of the probable general formula:

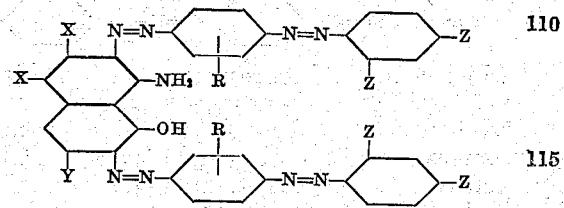

wherein one X means hydrogen, the other X a sulfonic acid group, Y hydrogen or a sulfonic acid group, one R hydrogen, an alkoxy, hydroxyl or carboxylic acid group, the other R an alkoxy, hydroxyl or carboxylic acid group, each Z an amino or hydroxy group and wherein the benzene nuceli may contain a halogen, alkoxy, alkyl or sulfonic acid group, which compounds represent when dry black powders soluble in water dyeing vegetable fibers black shades which become fast to washing and light when after-treated with formaldehyde and copper salts.

6. The azo dyestuffs of the probable formula:

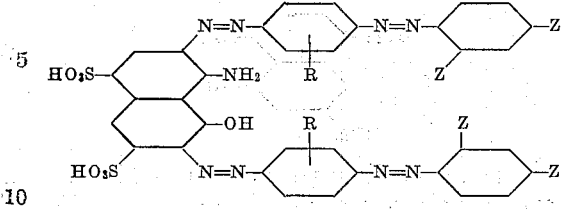

wherein one R means hydrogen, the other R a methoxy group, each Z an amino or hydroxy group and wherein the benzene nuceli containing R may be further substituted by chlorine, methoxy or methyl, which compounds represent when dry black powders soluble in water dyeing vegetable fibers black shades which become fast to washing and light when after-treated with formaldehyde and copper salts.

7. The azo dyestuff of the probable formula:

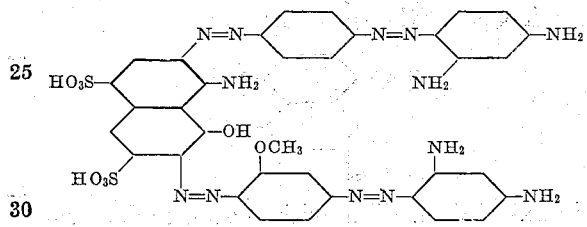

which compound represents when dry a black powder soluble in water, dyeing cotton black shades which become somewhat more greenish and fast to washing and light when after-treated with formaldehyde and copper salts.

8. The azo dyestuff of the probable formula:

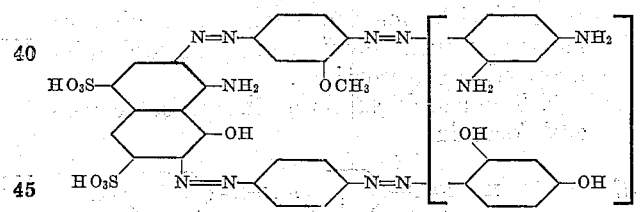

which compound represents when dry a black powder, soluble in water, dyeing the vegetable fiber full black shades which become somewhat more bluish and fast to washing and light when after-treated with formaldehyde and copper salts.

9. The azo dyestuff of the probable formula:

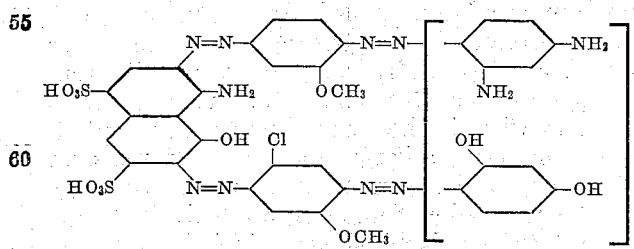

which compound represents when dry a black powder, soluble in water, dyeing the vegetable fiber full black shades which become somewhat more bluish and fast to washing and light when after-treated with formaldehyde and copper salts.

10. The dyestuff intermediates of the probable formula:

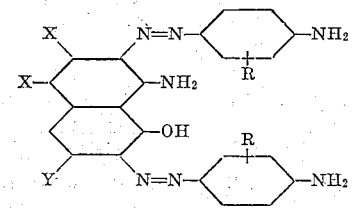

(wherein one X means hydrogen, the other X a sulfonic acid group, Y hydrogen or a sulfonic acid group, one R hydrogen, an alkoxy, hydroxyl or carboxylic acid group, the other R an alkoxy, hydroxyl or carboxylic acid group and the benzene nuclei may contain a halogen, alkoxy, alkyl or sulfonic acid group) which compounds yield when tetrazotized and combined with amino-hydroxy or diamino compounds of the benzene series valuable dyestuffs dyeing cotton black shades which become somewhat more greenish and fast to washing and light when after-treated with formaldehyde and copper salts.

In testimony whereof, we affix our signatures.

RICHARD FLEISCHHAUER.
CARLTHEO SCHULTIS.